United States Patent [19]
Riedel

[11] 3,788,170
[45] Jan. 29, 1974

[54] MECHANISM FOR RADIAL ADJUSTMENT OF TOOLS IN ROTARY TUBULAR TOOL HOLDERS OF SHAVING MACHINES OR THE LIKE

[75] Inventor: Franz Riedel, Solingen, Germany

[73] Assignee: Th. Kieserling & Albrecht, Solingen, Germany

[22] Filed: Oct. 29, 1971

[21] Appl. No.: 193,858

[30] Foreign Application Priority Data
Dec. 3, 1970 Germany...................... 2059565

[52] U.S. Cl. ................................................ 82/20
[51] Int. Cl. ........................ B23b 5/00, B23b 25/00
[58] Field of Search ........................................ 82/20

[56] References Cited
UNITED STATES PATENTS
| | | | |
|---|---|---|---|
| 3,426,627 | 2/1969 | Lorenz.................................... | 82/20 |
| 2,484,601 | 10/1949 | Abbey................................. | 82/20 X |

FOREIGN PATENTS OR APPLICATIONS
| | | | |
|---|---|---|---|
| 1,188,413 | 3/1965 | Germany............................... | 82/20 |

*Primary Examiner*—Leonidas Vlachos
*Attorney, Agent, or Firm*—Michael S. Striker

[57] ABSTRACT

A shaving machine for tubular or rod-like workpieces has a tubular tool holder which is rotatable in two axially spaced main antifriction bearings installed in the machine frame. An auxiliary antifriction bearing surrounds the tool holder between the two main bearings and its inner race is coupled by rods with a sleeve which is movable axially of the tool holder in the region of one main bearing. The sleeve has a conical internal surface abutting against complementary conical surfaces of several equidistant supports for shaving tools which are caused to move radially in response to axial movement of the sleeve. The outer race of the auxiliary bearing carries several nuts which mesh with axially parallel feed screws mounted in the machine frame and coupled to each other for simultaneous angular movement by means of pinions provided on the feed screws and meshing with an internal gear which is rotatable in the frame. A reversible electric motor can be drivingly connected with a gear on one of the feed screws by way of either one of two gear trains which can rotate the one feed screw at different speeds. As the one feed screw rotates in the frame, it causes the other feed screws to rotate to the same extent and in the same direction to thereby move the outer race of the auxiliary bearing axially of the tool holder. The outer race shifts the inner race which changes the axial position of the supports for shaving tools so that the tools move radially outwardly or inwardly.

8 Claims, 3 Drawing Figures

MECHANISM FOR RADIAL ADJUSTMENT OF TOOLS IN ROTARY TUBULAR TOOL HOLDERS OF SHAVING MACHINES OR THE LIKE

BACKGROUND OF THE INVENTION

The present invention relates to machine tools in general, and more particularly to improvements in machines wherein a rotary tubular holder carries one or more radially adjustable rolls, rollers, material removing tools or analogous elements. Still more particularly, the invention relates to improvements in mechanisms which can be utilized for radial adjustment of tools or other component parts supported by tubular holders in machines for the shaving of tubular or rod-shaped metallic workpieces or in analogous machine tools.

It is already known to change the radial positions of material removing tools in the rotary tubular holder or head of a shaving machine by employing a conical adjusting sleeve which is movable in the axial direction of the revolving head by means of an antifriction bearing. A drawback of presently known shaving machines of the just outlined character is that the extent of radial adjustment of the tools is rather limited because the bearing which must be shifted axially in order to change the axial position of the adjusting sleeve (and hence the radial positions of tools) constitutes one of the bearings in which the head is mounted for rotation in the machine frame. It was found that excessive axial displacements of such bearing affect the stability of the head, i.e., the head is likely to vibrate in the frame if the bearing is moved well beyond its normal position.

On the other hand, an antifriction bearing which forms part of an adjusting mechanism for radially movable tools in the rotary tubular tool holder or head of a shaving machine for rods or tubes exhibits many important advantages. Thus, the inner race of such bearing can rotate with the head and can be coupled with the aforementioned adjusting sleeve while the outer race need not rotate and can be readily moved with reference to the machine frame in the axial direction of the head. Consequently, the radial positions of tools can be changed while the shaving machine is in use because all axial movements of the outer race are shared by the inner race whereby the latter changes the axial position of the adjusting sleeve with the result that the tools are moved radially inwardly or outwardly, either while the shaving machine is idle or while the machine is in actual use, i.e., while the tools remove material from the periphery of a workpiece which is caused to move lengthwise through the rotating head.

German Pat. No. 1,188,413 discloses a shaving machine wherein the conical adjusting sleeve is coupled to the rotary tubular tool holder or head by means of keys so that it must rotate with the head but is movable axially to thereby change the positions of tools in the radial direction of the head. The inner race of one of two main antifriction bearings for the head is rigidly connected with the adjusting sleeve and the entire bearing is movable axially of the head to thereby change the axial position of the sleeve. The outer race of this bearing is mounted in the frame of the shaving machine and is connected with a drive which can move it axially whereby the inner race shares the axial movements of the outer race. The outer race is rigidly connected with a ring which forms part of the just mentioned drive and is movable axially in the machine frame. Keys or the like serve to hold the ring against rotation, and a motor is employed to change the axial position of the ring.

The use of one of the antifriction bearings for the rotary tubular tool holder or head as a component part of the adjusting mechanism for the radially movable tools of a shaving machine results in a reduction of the overall number of component parts because the axially adjustable bearing performs the dual function of guiding and supporting the rotary head as well as of transmitting motion to the adjusting sleeve. However, such proposal exhibits the aforementioned drawback that the axially movable bearing cannot properly support and guide the head, especially in a shaving machine for the treatmennt of relatively large and heavy workpieces. In such heavy-duty shaving machines, the axial length of the head is considerable and, since the head is normally mounted in two bearings each of which is adjacent to one of its axial ends, a substantial axial displacement of one such bearing invariably results in undesirable vibration of the head which affects the quality of the shaving operation and reduces the useful life of movable parts.

The trend in industries for the shaving, threading, deburring and/or analogous treatment of portions of or entire tubular or rod-like workpieces is toward machines which can be used with equal advantage for the shaving or other treatment of relatively short, relatively long, tubular, rod-like, small-diameter, medium-diameter or large-diameter workpieces. This can be achieved with the machine of the aforementioned German patent only if one of the two main bearings for the rotary tool holder or head is movable axially through a considerable distance so that, in one end position of the movable bearing, the actual distance between the two bearings is much less than the maximum distance. This unduly affects the quality of the shaving operation when the machine is used for treatment of external surfaces on large-diameter workpieces. This is due to the reduction in distance between the two main bearings and also to the fact that the path along which the movement of radial adjustment of the tools is transmitted in such machines is too long.

SUMMARY OF THE INVENTION

An object of the present invention is to provide a novel and improved adjusting mechanism for one or more radially movable elements in a machine wherein such elements are mounted in a rotary tubular holder, and to construct and assemble the adjusting mechanism in such a way that it can effect substantial or minimal adjustments of the radially movable element or elements without affecting the stability of the tubular holder.

Another object of the invention is to provide an adjusting mechanism whose parts can be moved to effect radial adjustments of one or more radially movable elements in a rotary tubular holder without any changes in the stability of the devices which support and guide the holder, and which can be used with particular advantage for simultaneous adjustment of one or more radially movable elements in highly versatile shaving or like machines for tubular or rod-shaped workpieces.

A further object of the invention is to provide an adjusting mechanism which can be installed in many types of presently known shaving or like machines without necessitating appreciable and/or costly alterations in the basic design and/or mode of operation of such machines.

An additional object of the invention is to provide an adjusting mechanism which enables a shaving or analogous machine to properly treat large-diameter or small-diameter workpieces with a high degree of precision and without undesirable vibration of the rotary tubular holder for shaving or like tools.

Still another object of the invention is to provide and adjusting mechanism which insures that the forces which must be applied to change the position of one or more radially movable elements in a rotary tubular holder for such elements can be transmitted to the machine frame along a very short path.

Another object of the invention is to provide an adjusting mechanism which renders it possible to effect radial adjustments of one or more tools or like elements at a plurality of speeds, while the machine wherein the adjusting mechanism is incorporated is idle, or while the machine is in operation.

An ancillary object of the invention is to provide an adjusting mechanism wherein a conical adjusting sleeve which is employed to effect radial adjustments of one or more elements mounted in a rotary tubular holder can be moved axially in a novel and improved way.

The invention is embodied in a machine tool, such as a shaving machine for tubular or rod-shaped metallic workpieces. The machine tool comprises a frame, a pair of axially spaced coaxial main antifriction bearings mounted in the frame, a tublar holder rotatably mounted in the main bearings, an adjusting member which is preferably a sleeve having a conical internal surface and is axially movably mounted in and rotatable with the holder, at least one tool support or an analogous element which is mounted in the holder for radial movement in response to axial movement of the adjusting member, and displacing means for moving the adjusting member axially of the holder. in accordance with a feature of the invention, such displacing means comprises an auxiliary antifriction bearing which surrounds the tubular holder between the two main bearings and has an inner race coupled to the adjusting member by one or more motion transmitting rods or the like. The outer race of the auxiliary bearing is movable axially in the frame by means of a drive which is mounted in or on the frame and is preferably designed to move the outer race at several speeds. The outer race entrains the inner race and thus effects an axial movement of the adjusting member with the result that the element or elements are moved radially of the tubular holder.

The outer race of the auxiliary bearing may be provided with several equidistant nuts meshing with axially parallel feed screws which are rotatable in the frame of the machine tool. The feed screws are rotatable to the same extent and in the same direction by an electric motor by way of any one of several power trains (such as gear trains) which can be connected with or disconnected from a selected feed screw by means of electromagnetically operated clutches or the like.

The novel features which are considered as characteristic of the invention are set forth in particular in the appended claims. The improved adjusting mechanism itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
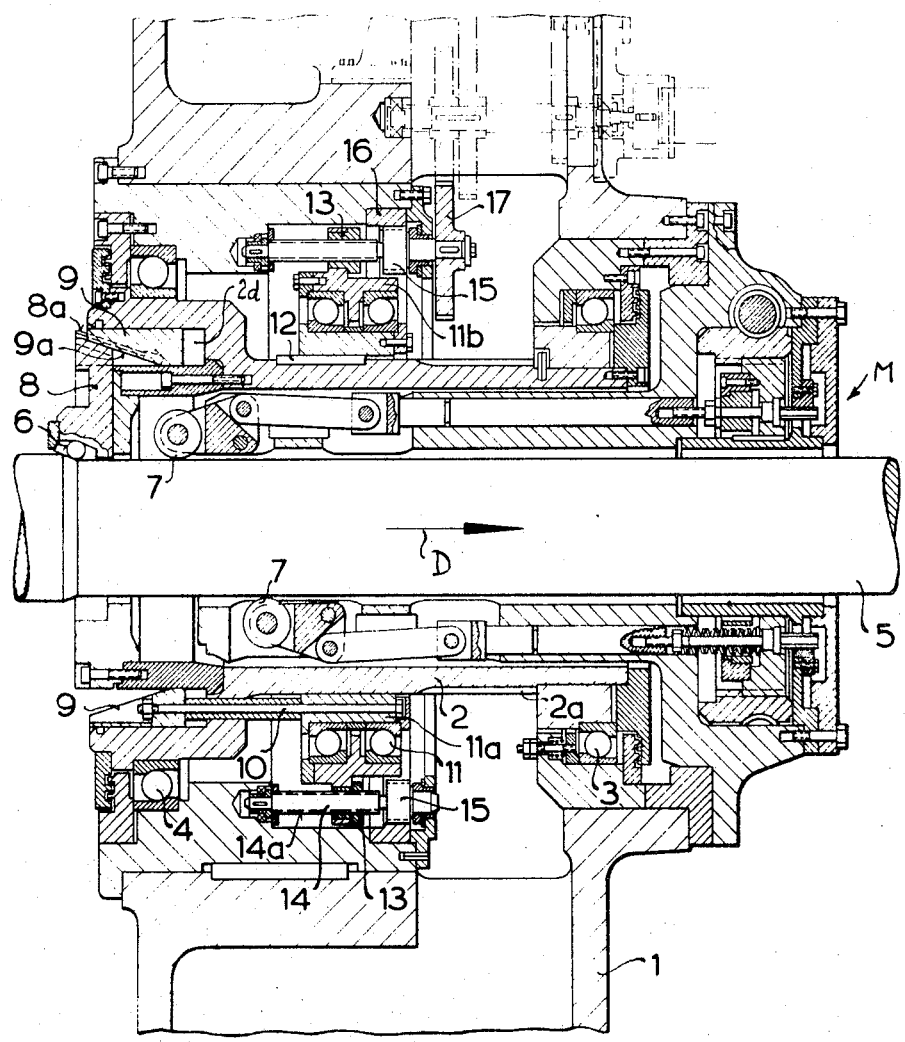
FIG. 1 is a fragmentary central vertical sectional view of a shaving machine with a rotary tool holder and a portion of an adjusting mechanism which can effect radial movements of tools with reference to the tool holder and is constructed and assembled in accordance with the present invention.
Figure 2:
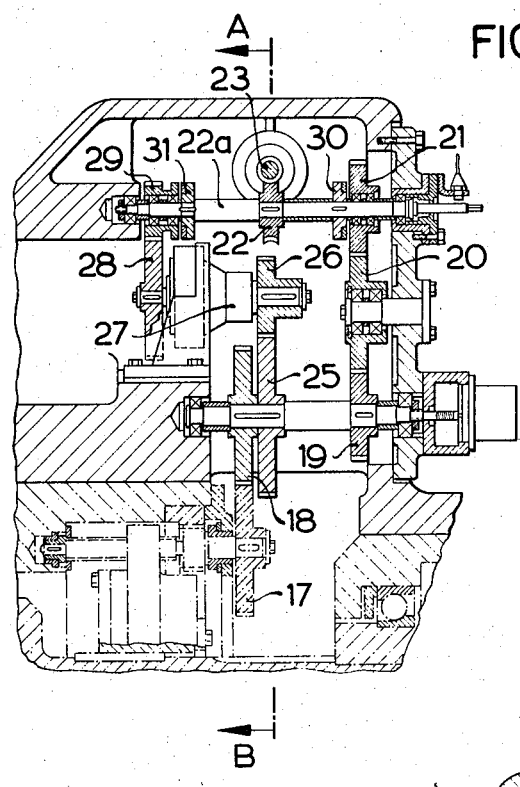
FIG. 2 is a similar sectional view showing certain additional parts of the adjusting mechanism.
Figure 3:
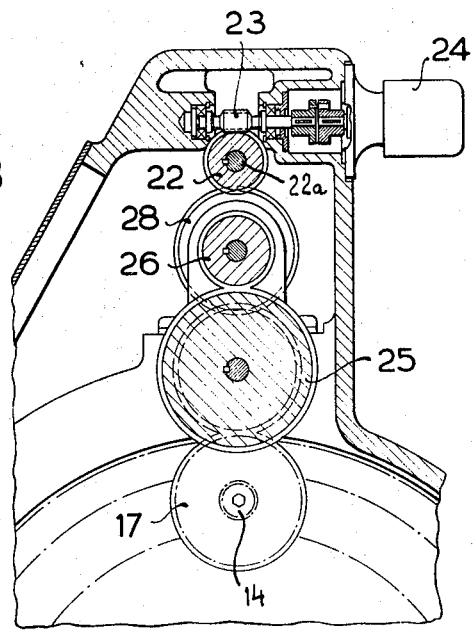
FIG. 3 is a sectional view as seen in the direction of arrows from the line A-B of FIG. 2.

Referring to the drawing in detail, there is shown a portion of a shaving machine for elongated rod-shaped or tubular workpieces 5. The machine comprises a frame 1 which accommodates two main antifriction bearings 3 and 4 for a tubular tool holder 2 in which a workpiece 5 passes lengthwise during removal of material from its exterior by a set of radially adjustable tools or knives 6 only one of which is shown in FIG. 1. The workpiece 5 is supported and fed lengthwise by suitable rollers (not shown) which are located upstream of the shaving station accommodating the tools 6. That portion of the workpiece 5 which passes through the tool holder 2 is centered and supported by two axially spaced sets of radially adjustable rolls 7, only one roll 7 of each set being shown in FIG. 1. For example, the tool holder 2 may carry two sets of three equidistant centering rolls 7 each. In the illustrated embodiment, the rolls 7 are mounted rather close to the shaving station which in turn is adjacent to the left-hand main antifriction bearing 4. The mechanism M which can effect individual or simultaneous radial adjustments of the centering rolls 7 is shown in FIG. 1 but the details of its construction form no part of the present invention. It suffices to say that each of the centering rolls 7 is preferably adjustable within a rather wide range so as to enable the machine to properly shave workpieces of relatively large, medium or small outer diameter.

The improved mechanism which serves to effect radial adjustments of the tools 6 with reference to the tool holder 2 comprises an adjusting sleeve 9 which is axially movably received in a recess 2d at the left-hand end of the tool holder 2. Each tool 6 is mounted on a supporting element or support 8 which is surrounded by the adjusting sleeve 9. As shown in FIG. 1, the sleeve 9 has a conical internal surface 9a which flares outwardly counter to the direction (arrow D) of lengthwise movement of the workpiece 5, and each tool support 8 has a complementary conical external surface 8a which abuts against the internal surface 9a. For example, the shaving machine may comprise three equidistant tools 6 and an equal number of supports 8, one for each tool. The adjusting sleeve 9 is surrounded by the left-hand main antifriction bearing 4 and is coupled with the inner race 11a of an auxiliary antifriction bearing 11 by several equidistant motion transmitting rods 10. One or more keys 12 are provided to hold the inner race 11a against angular movement with reference to the tool holder 2; however, such keys allow the inner race 11a to move axially of the holder 2. The inner race 11a is movable axially of the tool holder 2 by means of the outer race 11b of the bearing 11. To this end, the outer race 11b carries a set of equidistant nuts 13 which mesh with the external threads 14a of axially parallel feed screws 14. Each feed screw 14 is rotatably mounted in the frame 1 but is held against axial movement with reference to the tool holder 2. The pinions 15 on the feed screws 14 mesh with an internal gear 16 which is rotatably mounted in the frame 1. One of the feed screws 14 is further rigidly connected with a gear 17. The feed screws 14, the bearing 11, the internal gear 16, the gear 17 and the pinions 15 constitute component parts of a displacing device which serves to move the adjusting sleeve 9 axially of the tool holder 2. When the outer race 11b of the bearing 11 is caused to move axially and entrains the inner race 11a, the rods 10 shift the adjusting sleeve 9 with reference to the supports 8 whereby the supports 8 move radially inwardly or outwardly, depending on the direction of axial movement of the sleeve 9. Suitable springs or analogous biasing means (not shown) are provided to urge the surfaces 8a of the supports 8 against the surface 9a in all axial positions of the adjusting sleeve 9.

The displacing device of the adjusting mechanism further comprises a prime mover, such as a variable-speed reversible electric motor 24 mounted in or on the frame 1, which can rotate the gear 17 at several speeds, e.g., at a higher speed and at a lower speed. That power train which connects the output shaft of the motor 24 with the gear 17 when the latter is to be rotated at a higher speed comprises a gear 18 which meshes with the gear 17, a gear 19 which is coaxial with and shares all angular movements of the gear 18, an intermediate gear 20 which meshes with the gear 19, a gear 21 which is freely rotatable on a shaft 22a and meshes with the gear 20, an electromagnetic claw clutch 30 which can be energized to couple the gear 21 with the shaft 22a, a worm wheel 22 on the shaft 22a, and a worm 23 which is driven by the output shaft of the motor 24 and meshes with the worm wheel 22.

When the adjustment of the tools 6 is to be carried out at a lower or coasting speed, the gear 17 on one of the feed screws 14 is rotated by way of a second power train including the aforementioned gear 18 which meshes with the gear 17, a larger gear 25 which is coaxial with and shares all angular movements of the gear 18, a gear 26 which meshes with the gear 25, a clutch 27 whose output element drives the gear 26, a gear 28 which drives the input element of the clutch 27, a gear 29 which meshes with the gear 28 and is freely rotatable on the shaft 22a, and a second electromagnetically operated claw clutch 31 which can be energized to transmit torque from the shaft 22a to the gear 29. The gears 18, 19, 20, 21 constitute a step-up transmission and the gears 18, 25, 26, 28, 29 and clutch 27 constitute a step-down transmission. A rapid adjustment of the tools 6 in the radial direction of the tubular tool holder 2 will take place between successive treatments, e.g., if a large-diameter workpiece 5 is to be followed by a small-diameter workpiece or vice versa, and the slow adjustment of tools 6 will take place during treatment of a workpiece which passes through the holder 2 to thereby insure that the shaving machine can properly compensate for the wear on cutting edges of the tools 6. This enables the operators to insure that the diameter of each treated workpiece equals or does not deviate excessively from a desired diameter.

The tool holder 2 is provided with an annulus of gear teeth 2a which mesh with a driver gear, not shown. The latter receives torque from a transmission which is driven by a variable speed motor, not shown, in a manner well known from the art of shaving machines for tubular or rod-shaped metallic workpieces. As mentioned before, the supports 8 for the tools 6 are biased radially outwardly to remain in constant engagement with the conical surface 9a irrespective of whether the adjusting sleeve 9 moves in a direction to the right or to the left, as viewed in FIG. 1. It is preferred to connect the supports 8 with each other in such a way that they move radially inwardly or outwardly as a unit and always to the same extent.

The motor 24 can be started to rotate the shaft 22a in a direction to the right or to the left by one or more detectors which scan the diameter of the finished portion of a workpiece, i.e., that portion which has been advanced beyond the shaving station. The clutches 30, 31 can be engaged or disengaged by hand or in accordance with a predetermined program.

An important advantage of the improved adjusting mechanism is that the main bearings 3 and 4 for the tool holder 2 need not be moved axially so that the stability of the tool holder is not affected by radial adjustments of the tools 6. Thus, the likelihood of vibration is very remote, even if the machine embodying the improved adjusting mechanism is used for the shaving of large-diameter workpieces because the bearings 3, 4 can be mounted at such a distance from each other that they prevent vibration of the tool holder 2 under any normal operating conditions. The forces which are exerted in order to change the radial positions of tools 6 are transmitted to the frame 1 along a very short path because the sleeve 9 is closely adjacent to one (4) of the two main antifriction bearings.

It is evident that the improved adjusting mechanism can be used with equal advantage in many other types of machine tools without departing from the spirit of the invention. For example, the adjusting mechanism can be utilized in thread cutting machines, in machines for removing ridges, burrs or fins from external surfaces of tubular or rod-shaped workpieces, in chamfering machines and/or in other machines for preliminary, intermediate or final treatment of workpieces which are surrounded by a tubular holder for radially adjustable material removing or analogous tools.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended

1. In a machine tool, such as a machine for the shaving of elongated tubular or rod-shaped workpieces, a combination comprising a frame; a pair of axially spaced coaxial main antifriction bearings installed in said frame; a tubular holder rotatably mounted in said main bearings; an adjusting member having a conical surface and being movable axially of said holder in the region of one of said main bearings; at least one element mounted in said holder and having a complimentary conical surface abutting against the conical surface of said adjusting member so as to be radially moved in response to axial movement of said adjusting member; a material removing tool carried by said element and arranged substantially in a plane normal to the axis of said tubular holder and intersecting said conical surface of said element; and displacing means for moving said adjusting member axially of said holder, said displacing means comprising an auxiliary antifriction bearing coupled with said adjusting member and surrounding said holder intermediate said main bearings, and means for moving said auxiliary bearing axially of said holder.

2. A combination as defined in claim 1, wherein said auxiliary bearing has an outer race coupled with said moving means and an inner race which is movable axially of said holder in response to movement of said outer race, said displacing means further comprising at least one motion transmitting member coupling said inner race to said adjusting member.

3. A combination as defined in claim 2, further comprising means for holding said inner race against rotation with reference to said holder, said outer race being mounted in said frame and being movable with respect to said frame in the axial direction of said holder.

4. In a machine tool, such as a machine for the shaving of elongated tubular or rod-shaped workpieces, a combination comprising a frame; a pair of axially spaced coaxial main antifriction bearings installed in said frame; a tubular holder rotatably mounted in said main bearings; an adjusting member mounted in said holder for axial movement with respect thereto; at least one element mounted in said holder for radial movement in response to axial movement of said adjusting member; and displacing means for moving said adjusting member axially of said holder, said displacing means comprising an auxiliary antifriction bearing having an outer race coupled with said moving means and an inner race movable axially of said holder in response to movement of said outer race, at least one motion transmitting member coupling said inner race to said adjusting member, and means for moving said auxiliary bearing axially of said holder, said last-mentioned means comprising at least one feed screw rotatably mounted in said frame in parallelism with the axis of said holder, a nut provided on said outer race and meshing with said feed screw, a gear mounted on said feed screw, and a drive including a prime mover arranged to rotate said gear at at least one predetermined speed.

5. A combination as defined in claim 4, wherein said means for moving said auxiliary bearing comprises a plurality of parallel feed screws and a plurality of nuts each provided on said outer race and each meshing with a different feed screw, each of said feed screws further comprising a pinion and said means for moving further comprising a ring gear rotatably mounted in said frame and meshing with said pinions so that rotation of said one feed screw by means of said gear entrails identical angular movements of the other feed screws by way of the pinion on said one feed screw, said ring gear and the pinions of said other feed screws.

6. A combination as defined in claim 4, wherein said drive further comprises a pair of power trains and clutch means operable to connect a selected power train with said prime mover and said gear.

7. A combination as defined in claim 6, wherein each of said power trains comprises a gear train and wherein one of said power trains is arranged to rotate said gear at a speed higher than the other power train.

8. A combination as defined in claim 7, wherein said prime mover is a reversible electric motor.

* * * * *